Dec. 29, 1953   E. L. DANIELSON ET AL   2,663,910
METHOD OF FORMING A MULTIPART PLASTIC STRUCTURE
Filed July 6, 1951   2 Sheets-Sheet 2

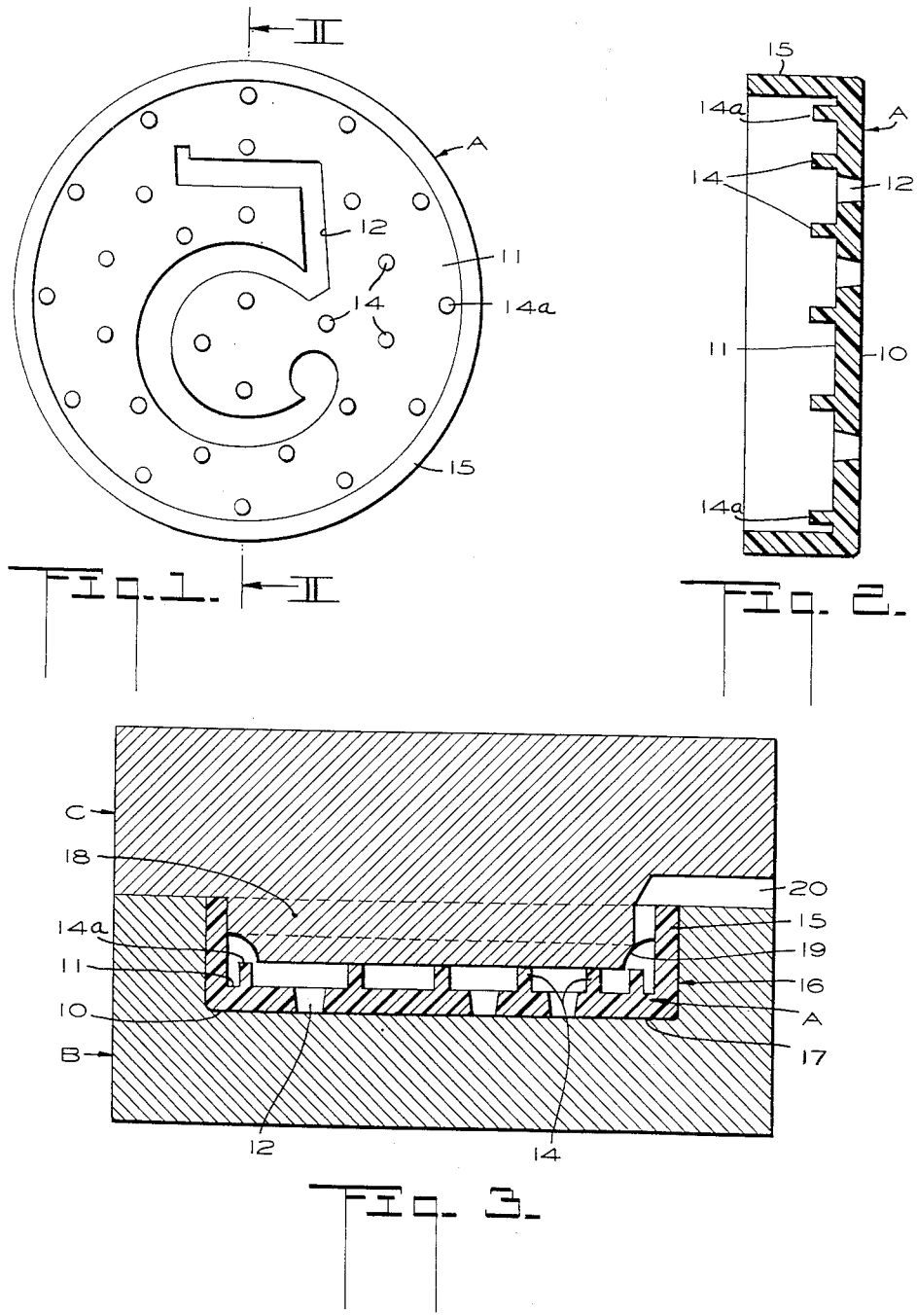

INVENTORS
ELMER L. DANIELSON
FLOYD J. DOFSEN
BY Munn, Liddy & Glaccum
ATTORNEYS

Patented Dec. 29, 1953

2,663,910

UNITED STATES PATENT OFFICE 2,663,910

METHOD OF FORMING A MULTIPART PLASTIC STRUCTURE

Elmer L. Danielson, Oakland, and Floyd J. Dofsen, San Francisco, Calif., assignors to Elmer L. Danielson and Floyd J. Dofsen, as joint tenants.

Application July 6, 1951, Serial No. 235,416

5 Claims. (Cl. 18—59)

1

The present invention relates to an improved method of forming a multi-part plastic structure, and it consists of the steps of the method hereinafter described and claimed.

This application embodies steps which are inherent in our following copending cases, but are treated herein as constituting a separate invention: (a) Method for Forming a Composite Plastic Structure, Serial No. 203,992, filed January 2, 1951, now Patent No. 2,607,957, dated August 26, 1952; and (b) Method for Forming a Multi-Part Plastic Article, Serial No. 207,174, filed January 22, 1951, now Patent No. 2,609,570, dated September 9, 1952.

Generally speaking, we provide a precast plastic part having a character-defining slot extending therethrough, and this part is made in a selected color. Thereafter, a second plastic part is cast in a contrasting color so as to provide a character in the slot of the first part, and with the two parts bonded together into a unitary structure. It is particularly important this second casting be accomplished without allowing the material for the second part to flash over that face of the precast part that normally will be exposed to view of an individual in the final structure.

More specifically stated, we precast the first plastic part with projections extending from a rear face thereof against which a second plastic part is to be cast, and further having a character-defining slot extending between the rear and front faces of the precast part. Subsequently, the precast part is placed in the cavity of a mold die, with the projections extending toward the mouth of the cavity, and the front surface of the precast part abutting a supporting wall defining the bottom of the cavity.

Thereupon, a second mold die is brought into coacting relation with the first to close the cavity, while utilizing the second die to apply pressure upon the projections to move and hold the front face of the precast part into intimate contact with the supporting wall to prevent the material for the second part from flashing therebetween. Upon injecting the material for the second part under heat and pressure into the unoccupied space of the cavity, the character is produced in the slot.

Moreover the injection of the material for the second part is accomplished so as to bond the two parts together into a unitary structure.

Other objects and advantages will appear as the specification continues, and the novel features of the invention will be set forth in the claims hereunto appended.

2

Drawings

For a better understanding of our invention, reference should be had to the accompanying drawings, forming part of this application, in which:

Figure 1 is a rear view of a precast plastic part, illustrating a character-defining slot extending therethrough, and a series of projections extending therefrom;

Figure 2 is a vertical sectional view taken along the plane II—II of Figure 1;

Figure 3 is a sectional view disclosing the precast part disposed in the cavity of a mold die, and a second die coacting with the first to close the cavity and bearing against the projections to hold the front face of the precast part against the bottom wall of the cavity;

Figure 4:
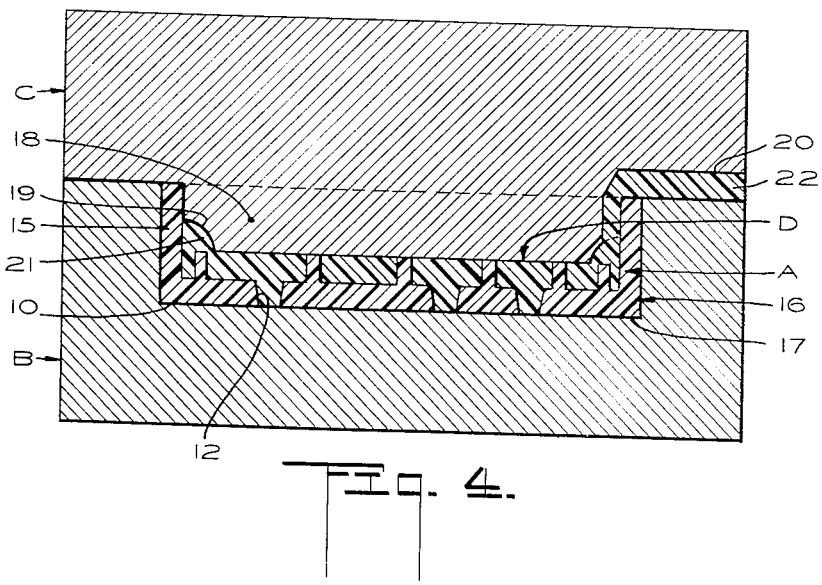
Figure 4 is a view corresponding to Figure 3, but disclosing the plastic material for the second part injected into the unoccupied space of the die cavity.

While we have shown only one embodiment of our invention, it should be understood that various changes, or modifications, may be made within the scope of the annexed claims without departing from the spirit thereof.

Detailed description

Referring now to the drawings in detail, we show a precast first part indicated generally at A, which may be made from suitable thermoplastic material in a selected color. This precast part has front and rear faces 10 and 11, respectively, having a character-defining slot 12 extending between these faces. Moreover, a plurality of projections 14 and 14a are provided on the rear face 11 of this part so as to extend therefrom.

Although the numeral 5 has been selected for the purpose of illustrating a slot, the term "character" is sufficiently generic to include any discriminating mark, sign, letter, symbol or design.

As illustrated in the drawings, the precast part A includes an annular wall 15. However, we do not wish to be limited in this respect. Our final structures may be key caps for calculators or typewriters, telephone dials, stove knobs, clock faces, etc. Such structures are mentioned by way of disclosing various items that may be made by employing our method.

Turning to Figure 3, we have shown a lower mold die B as being provided with a cavity 16 therein. This cavity is designed to receive and support the precast part A, with the front face 10 of the latter resting on the bottom wall 17 of the cavity. This wall conforms to and provides a barrier forming a flush closure over the slot 12 at the front face 10 of the precast part.

After the precast part A has been disposed in the cavity of the lower die mold, with the projections 14—14a extending upwardly toward the mouth or open top of the cavity 16, an upper mold die C is moved into coacting relation with the lower die to close the mold cavity. As clearly shown in Figure 3, the upper die has a core 18 extending downwardly into the cavity 16 upon closing the mold.

This core is adapted to bear against the projections 14 to apply downward pressure upon the latter, and thus moving and holding the front face 10 of the precast part A in intimate contact with the supporting bottom wall 17 of the die cavity. It will be observed that the core is grooved at 19, or otherwise shaped, so as not to bear against the projections 14a for the purpose to be set forth later.

Figure 5:
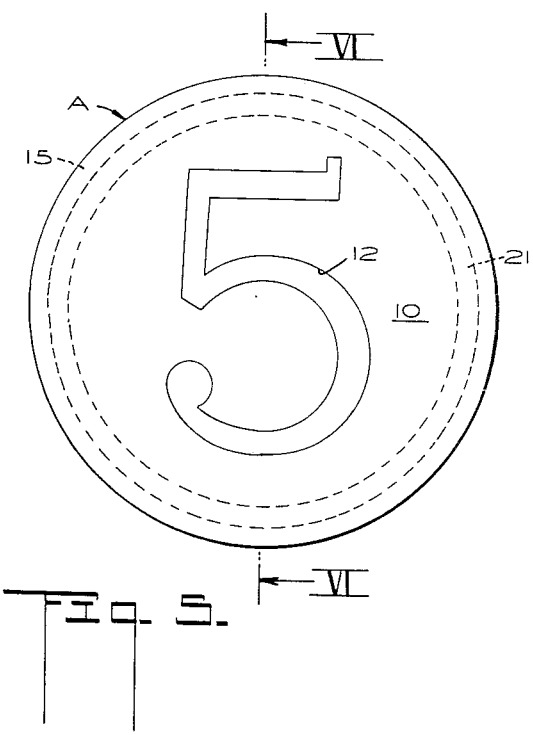
Figure 5 is a front face view of the final structure.
Figure 6:
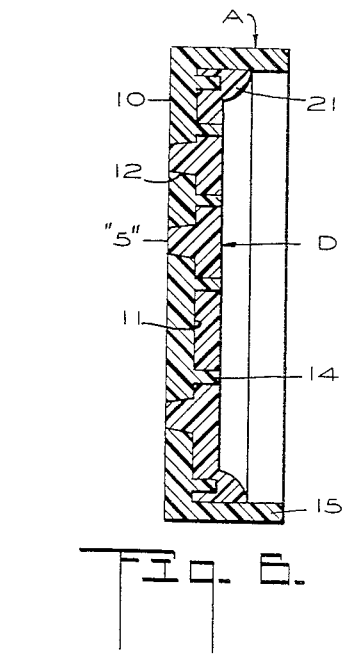
Figure 6 is a vertical sectional view taken along the plane VI—VI of Figure 5.

Now a thermoplastic plastic material for a second part D is injected through a channel 20 so as to fill the unoccupied space of the mold cavity. This material has a color contrasting with the part A and will fill the slot 12, as shown in Figure 4, providing a character herein shown as the numeral 5. This character will be viewable from the front face 10 in the final structure (see Figures 5 and 6).

The intimate contacting relation maintained between the front face 10 of the precast part A and the bottom wall 17 of the mold cavity will prevent any flashing therebetween during the injection of the second plastic material. This is an important feature of our invention.

It will be noted that the second part D is cast to provide a backing on the rear face 11 of the precast part, which is formed integral with the character 5. This backing extends around and embeds the projections 14. The groove 19 provides ample room in the die cavity to form a fillet-like rim 21 on the second part D that merges into the annular wall 15 of the precast part. Also, this rim embeds and conceals the projections 14a (see Figure 6).

The thermoplastic material for the second part D is injected under pressure and temperature. The range of temperature employed is such that the marginal portions of the projections 14—14a will soften so that the first and second parts A and D, respectively, will bond together into a unitary structure. However, this temperature is controlled to the point that the remaining unsoftened portions of the projections 14 will have sufficient rigidity for transmitting force from the second die C to maintain the front face 10 of the precast part against the bottom wall 17 of the mold cavity.

In this connection, we wish to point out the fact that relatively large projections 14 would absorb the heat without softening the marginal portions thereof. On the other hand, very small projections would melt away during the injection of the second material, and thus the upper die no longer would force the front face 10 of the precast part down against the bottom wall 17 of the die cavity. Accordingly, a critical range exists for the proper sizes of the projections, depending upon the temperature and pressure employed and the distance they are spaced from the point where the second plastic enters the mold.

After the proper cooling time has elapsed, the dies B—C are opened, and the composite plastic structure A—D removed. The sprue 22 may be snapped off readily, since it is not desired in the final structure. The projections 14a are shown in Figure 2 as being of the same height as the projections 14. In certain cases, the projections 14a could be shorter than the other projections 14 and thus be embedded in the second plastic.

We claim:

1. In the herein described method of forming a multipart plastic structure, the steps of: precasting a first plastic part with a plurality of individual spaced-apart projections extending from a rear face thereof; said face being adapted to have a second plastic part cast thereagainst; this precast part being provided with a character-defining slot extending therethrough from its rear face to an opposing front face; butting the front face of the precast part against a supporting wall to provide a barrier over the slot at the front face of this part; applying pressure against the projections in a direction to move and hold the front face of the precast part in intimate contact with the supporting wall; and injecting material for a second plastic part under heat and force against said rear face of the precast part to fill the spaces among the projections, with said material surrounding and embedding the projections; the temperature of the injected material being sufficient to bond the two plastic parts into a unitary structure; said material further filling the slot to provide a character therein viewable from the front face of the precast part in the final structure; the injecting of the material for the second part being accomplished while maintaining the pressure on the projections to thereby retain the front face of the precast part up against the supporting wall to prevent this material from flashing therebetween and marring the front face of the precast part, and further preventing said front face from yielding away from the supporting wall during the injecting of the material for the second part.

2. The method as defined in claim 1, in which the temperature of the plastic material for the second part is sufficient to soften portions of the projections so that the first and second plastic parts will be bonded together, while leaving the remaining portions of the projections sufficiently rigid for transmitting the pressure, when applied upon the projections, to the front face of the precast part to thereby maintain this face in intimate contact with the supporting wall.

3. The method as defined in claim 1, in which the projections are cast so as to be dispersed over an area entirely surrounding the slot in the precast part to thereby effectively hold the front face of this part against the supporting wall when the pressure is applied to the projections in a direction toward said wall.

4. The method as defined in claim 1, in which at least some of the projections are cast adjacent to the walls of the slot to thus aid in preventing the front face of the precast part, in the region of the slot, from yielding away from the supporting wall, while said pressure is maintained on the projections.

5. In the herein described method of forming a multipart plastic structure, the steps of: precasting a first plastic part with a plurality of individual spaced-apart projections extending from a rear face thereof; said face being adapted to have a second plastic part cast thereagainst; this precast part being provided with a character-defining slot extending therethrough from its rear face to an opposing front face; butting the front face of the precast part against a supporting wall to provide a barrier over the slot at the front face of this part; applying pressure against certain of the projections in a direction to move and hold the front face of the precast part in intimate contact with the supporting wall, the remaining projections being kept free of such pressure; and injecting material for a second plastic part under heat and force against said rear face of the precast part to fill the spaces among the projections, with said material surrounding and embedding the projections; the temperature of the injected material being sufficient to bond the two parts into a unitary structure; said material entirely covering those projections not subjected to said pressure; said material further filling the slot to provide a character therein viewable from the front face of the precast part in the final structure; the injecting of the material for the second part being accomplished while maintaining the pressure on the projections to thereby retain the front face of the precast part up against the supporting wall to prevent this material from flashing therebetween and marring the front face of the precast part, and further preventing said front face from yielding away from the supporting wall during the injecting of the material for the second part.

ELMER L. DANIELSON.
FLOYD J. DOFSEN.

References Cited in the file of this patent

UNITED STATES PATENTS

| Number | Name | Date |
|---|---|---|
| 2,120,553 | Flader | June 14, 1938 |
| 2,285,963 | Gits | June 9, 1942 |
| 2,298,365 | Gits | Oct. 13, 1942 |
| 2,350,787 | Martin | June 6, 1944 |